US008231329B2

(12) United States Patent
Benjamin et al.

(10) Patent No.: US 8,231,329 B2
(45) Date of Patent: Jul. 31, 2012

(54) TURBINE BLADE COOLING WITH A HOLLOW AIRFOIL CONFIGURED TO MINIMIZE A DISTANCE BETWEEN A PIN ARRAY SECTION AND THE TRAILING EDGE OF THE AIR FOIL

(75) Inventors: Edward D. Benjamin, Simpsonville, SC (US); Daniel D. Snook, Moore, SC (US)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 12/346,278

(22) Filed: Dec. 30, 2008

(65) Prior Publication Data
US 2010/0166564 A1  Jul. 1, 2010

(51) Int. Cl.
F03B 15/04  (2006.01)
(52) U.S. Cl. ............................ 415/115; 416/97 R
(58) Field of Classification Search ............... 416/96 A, 416/97 R; 415/115
See application file for complete search history.

(56) References Cited

U.S. PATENT DOCUMENTS

| | | | |
|---|---|---|---|
| 4,056,332 A * | 11/1977 | Meloni | 416/97 A |
| 4,297,077 A | 10/1981 | Durgin et al. | |
| 4,515,523 A | 5/1985 | North et al. | |
| 5,511,937 A * | 4/1996 | Papageorgiou | 415/115 |
| 6,742,991 B2 * | 6/2004 | Soechting et al. | 416/97 R |
| 6,824,352 B1 | 11/2004 | Moore et al. | |
| 7,121,787 B2 * | 10/2006 | Jacks et al. | 415/115 |

* cited by examiner

Primary Examiner — Benny Lee
(74) Attorney, Agent, or Firm — Mark E. Henderson; Ernest G. Cusick; Frank A. Landgraff

(57) ABSTRACT

A turbine blade with a generally hollow airfoil having an outer wall that defines a chamber for receiving cooling air, the airfoil comprising a leading edge that resides in an upstream direction, a trailing edge that resides in a downstream direction, a convex suction side, a concave pressure side, and an insert disposed within the chamber that is configured to initially receive at least a portion of the cooling air entering the chamber and direct the cooling air through a plurality of insert apertures to cool the inner surface of the outer wall, the insert further comprising a configuration that generally conforms to the contour of the outer wall of the chamber but in spaced relation thereto, wherein the chamber and insert narrow as they extend toward the trailing edge, the insert eventually terminating and the chamber eventually terminating at a pin array section, wherein a first distance exists that comprises the generally axial distance between the position of downstream termination point of the insert and the position of an upstream beginning point of the pin array section, wherein the pin array section, at a downstream end, comprises a plurality of openings that define an inlet to a plurality of trailing edge cooling apertures, and wherein the chamber, the insert, and the pin array section are configured such that the first distance is approximately minimized.

18 Claims, 4 Drawing Sheets

TURBINE BLADE COOLING WITH A HOLLOW AIRFOIL CONFIGURED TO MINIMIZE A DISTANCE BETWEEN A PIN ARRAY SECTION AND THE TRAILING EDGE OF THE AIR FOIL

BACKGROUND OF THE INVENTION

This present application relates generally to apparatus, methods and/or systems for improving the efficiency and/or operation of turbine engines. More specifically, but not by way of limitation, the present application relates to apparatus, methods and/or systems for cooling turbine airfoils via the circulation of a coolant through internal cooling circuits or passageways.

A gas turbine engine typically includes a compressor, a combustor, and a turbine. (Note that although the present invention may be described primarily in reference to an exemplary gas turbine engine, it is not so limited, and this reference is provided only as an example. A person of ordinary skill in the art will appreciate that embodiments of the present invention also may be used in aircraft engines and other types of rotary engines.) The compressor and turbine generally include rows of turbine blades or airfoils that are axially stacked in stages. Each stage may include alternating rows of circumferentially-spaced stator blades, which are fixed, and rows of circumferentially spaced rotor blades, that rotate about a central axis or shaft. In operation, the rotor blades in the compressor rotate about the shaft to compress a flow of air. The supply of compressed air then is used in the combustor to combust a supply of fuel. The resulting flow of hot gases from the combustion then is expanded through the turbine section of the engine, which induces the turbine rotor blades to rotate. With the rotor blades being connected to a central shaft, the rotation of the rotor blades induces the shaft to rotate.

In this manner, the energy contained in the fuel is converted into the mechanical energy of the rotating shaft, which may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, turbine airfoils, which, as described, generally include the rotating rotor blades and the fixed, circumferentially-spaced stator blades, become highly stressed with extreme mechanical and thermal loads.

Of course, the objective of designing and building more efficient turbine engines is a significant one, particularly considering the growing scarcity and increasing cost of fossil fuels. While several strategies for increasing the efficiency of turbine engines are known, it remains a challenging goal because the known alternatives, which, for example, include increasing the size of the engine, increasing the temperatures through the hot-gas path, and increasing the rotational velocities of the rotor blades, generally place additional strain on parts, including additional strain on turbine airfoils, which are already highly stressed. As a result, improved apparatus, methods and/or systems that reduce operational stresses placed on turbine airfoils or allow the turbine airfoils to better withstand these stresses are in great demand.

As one of ordinary skill in the art will appreciate, one strategy for alleviating thermal stresses is through cooling the airfoils such that the temperatures experienced by the airfoils are lower than that of the hot-gas path. Effective cooling may, for example, allow the airfoils to withstand higher firing temperatures, withstand greater mechanical stresses at high operating temperatures, and/or extend the part-life of the airfoil, all of which may allow the turbine engine to be more cost-effective and efficient. One way to cool airfoils during operation is through the use of internal cooling passageways or circuits. Generally, this involves passing a relatively cool supply of compressed air, which may be supplied by the compressor of the turbine engine, through internal cooling circuits within the airfoils. As the compressed air passes through the airfoil, it convectively cools the airfoil, which may allow the part to withstand firing temperatures that it otherwise could not.

In some instances, the supply of compressed air is released through small holes on the surface of the airfoils. Released in this manner, the supply of air forms a thin layer or film of relatively cool air at the surface of the airfoil, which both cools and insulates the part from the higher temperatures that surround it. This type of cooling, which is commonly referred to as "film cooling," however, comes at an expense. The release of the compressed air in this manner over the surface of the airfoil, lowers the aero-efficiency of the engine, especially, in the case of nozzles or stator blades, if the air is released downstream of the throat. Better strategies that enhance the internal cooling through the airfoil such that film cooling could be minimized or reduced would generally increase the efficiency of the turbine engine. In addition, airfoils have cooling "dead spots," which, generally, are locations that are difficult to cool because of certain fabrication and shape limitations of the airfoil. Finding ways to better cool these locations would benefit the useful life of the airfoils and increase the firing temperatures attainable by the engine. As a result, there is an ongoing need for improved cooling strategies for turbine airfoils.

SUMMARY OF THE INVENTION

The present application thus describes a turbine blade with a generally hollow airfoil having an outer wall that defines a chamber for receiving cooling air, the airfoil comprising a leading edge that resides in an upstream direction, a trailing edge that resides in a downstream direction, a convex suction side, a concave pressure side, and an insert disposed within the chamber that is configured to initially receive at least a portion of the cooling air entering the chamber and direct the cooling air through a plurality of insert apertures to cool the inner surface of the outer wall, the insert further comprising a configuration that generally conforms to the contour of the outer wall of the chamber but in spaced relation thereto, wherein a portion of the cooling air exits the airfoil through a plurality of film cooling apertures formed through the outer wall, wherein the chamber and insert narrow as they extend toward the trailing edge, the insert eventually terminating and the chamber eventually terminating at a pin array section, which includes a passageway in which a plurality of cooling pins extend transversely across and are integral to the opposed walls that define the pin array section, wherein a first distance exists that comprises the generally axial distance between the position of downstream termination point of the insert and the position of an upstream beginning point of the pin array section, wherein the pin array section, at a downstream end, comprises a plurality of openings that define an inlet to a plurality of trailing edge cooling apertures that extend from the pin array section to the trailing edge of the airfoil where an outlet is provided through which a portion of the cooling air may exit the airfoil, and wherein the chamber, the insert, and the pin array section are configured such that the first distance is approximately minimized.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
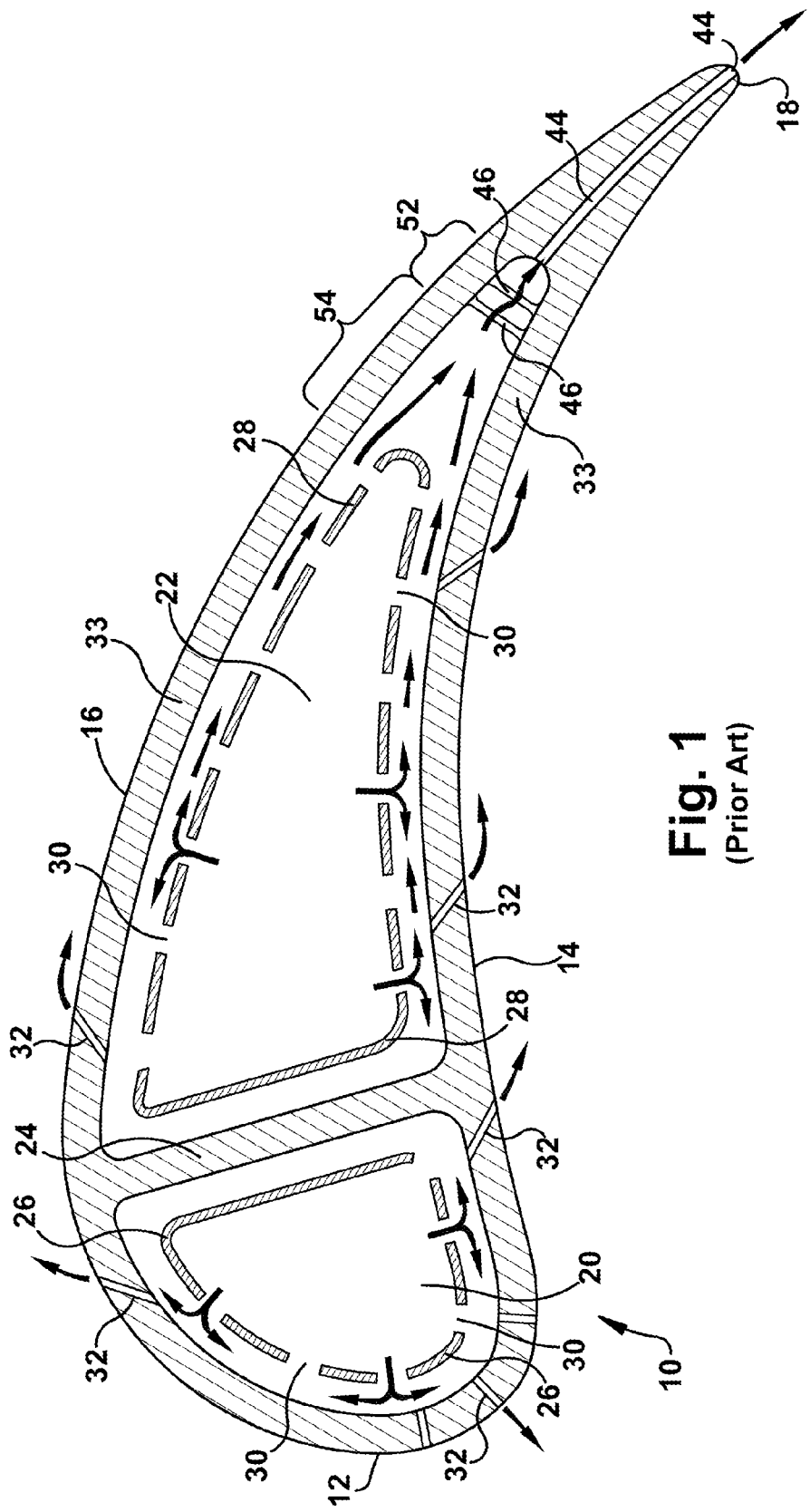
FIG. 1 is a cross sectional view of a conventional air-cooled airfoil.

Referring now to the figures, where the various numbers represent like parts throughout the several views and may not be described in detail in every drawing figure in which they appear, FIG. 1 illustrates a conventional air-cooled airfoil 10. As shown, the airfoil 10 includes an overall airfoil shape, and has a nose or leading edge 12, a pressure side or surface 14, a suction side 16 and a trailing edge 18. The airfoil 10 is generally hollow and, often, is divided into two internal chambers 20, 22 by an intermediate partition 24. Each chamber 20, 22 encloses a hollow insert 26, 28 having a configuration generally conforming to the internal contour of the respective chamber but in spaced relation thereto. The inserts 26, 28 contain apertures 30 in preselected locations. High pressure cooling air from the turbine compressor is directed into the inserts per conventional systems and methods, and is exhausted through such apertures to form jets of air striking the inner walls of the chambers 20, 22 for impingement cooling (as shown by the arrows).

More particularly, the apertures 30 of insert 26 in the leading edge chamber 20 are located to impinge on the chamber wall opposite the insert 26. The cooling air forced into the leading edge chamber 20 and through the insert 26 is exhausted through radially spaced rows of film cooling apertures 32 that pass through the outer wall 33 of the airfoil. The outer wall 33 encloses and forms the interior cavities. This exhausted cooling air provides a layer of boundary air adjacent the exterior surfaces of the airfoil to limit direct contact of the hot flow on the surfaces such that heat transfer to the airfoil from the working fluid is inhibited. The cooling air forced into the trailing edge chamber 22 and through the trailing edge insert 28 is exhausted therefrom either through film cooling apertures 32 or through trailing edge cooling apertures 44 extending from the trailing edge chamber 22 to the trailing edge 18 of the airfoil. A plurality of rows of generally cylindrical cooling pins or pins 46 may extend across a pin array section 52 that resides between the trailing edge chamber 22 and the trailing edge cooling aperture 44.

In airfoil 10, the general area that resides between the trailing edge insert 28 and the pin array section 52 is difficult to cool. This region, hereinafter referred to as the "low heat transfer region 54," is an area of low heat transfer coefficients and, as such, a place where a hot spot develops during operation. This is due to a number of factors. First, there is little or no flow impingement from the insert 28. Second, until the trailing edge of the chamber 22, i.e., near the entry to the trailing edge cooling aperture 44, the chamber 22 is too wide for cooling pins 46 to be effectively manufactured. Without such a heat transfer augmentation feature, the heat transfer coefficient remains low. Therefore, this region is prone to higher metal temperatures, which, ultimately, may decrease the part life of the airfoil. In addition, as one of ordinary skill in the art will appreciate, releasing air from film cooling apertures 32 that are located downstream of the throat 119 has a significant negative effect to the aerodynamic efficiency of the part. As a result, cooling air released through apertures that are located downstream of the throat 119 (See FIG. 2 for approximate location of the throat) is minimized. Because of this, there typically is not much film cooling to the low heat transfer region 54, especially on the suction side of the airfoil, which, of course, exacerbates the problem of keeping this area sufficiently cool during operation.

Figure 2:
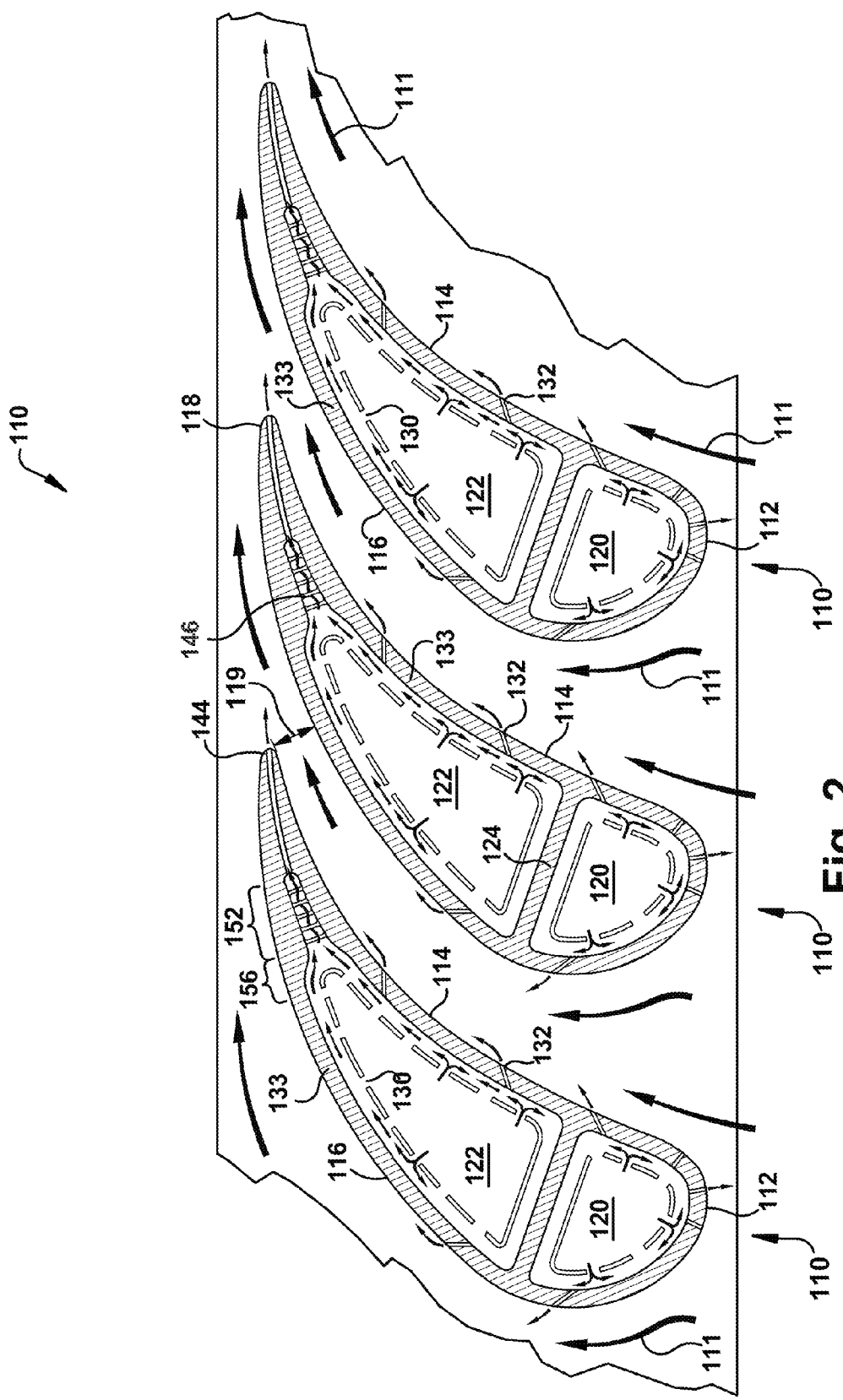
FIG. 2 is a cross-sectional view of an airfoil illustrating internal cooling circuits according to an exemplary embodiment of the present application.

Referring now to FIG. 2, a plurality of turbine airfoils 110 according to an embodiment of the present invention are shown in an assembled configuration. The orientation of the hot gas flow path through a turbine is shown to be generally in the direction of the arrows 111. As shown, each airfoil 110 comprises an airfoil shaped configuration having a nose or leading edge 112, a pressure side 114, a suction side 116 and a trailing edge 118. (Note that as used herein, reference, without further specificity, to a "rotor blade" is a reference to the rotating blades of either the compressor or the turbine, which include both compressor rotor blades and turbine rotor blades. Reference, without further specificity, to a "stator blades" is a reference to the stationary blades of either the compressor or the turbine, which include both compressor stator blades and turbine stator blades. The term "blade" will be used herein to refer to either type of blade. Thus, without further specificity, the term "blade" is inclusive generally to all four types of turbine engine blades already listed, i.e., compressor rotor blades, compressor stator blades, turbine rotor blades, and turbine stator blades and other similar types of turbine engine blades.) As one of ordinary skill in the art will appreciate, a throat 119 represents the minimum flow area between two of the airfoils.

Figure 3:
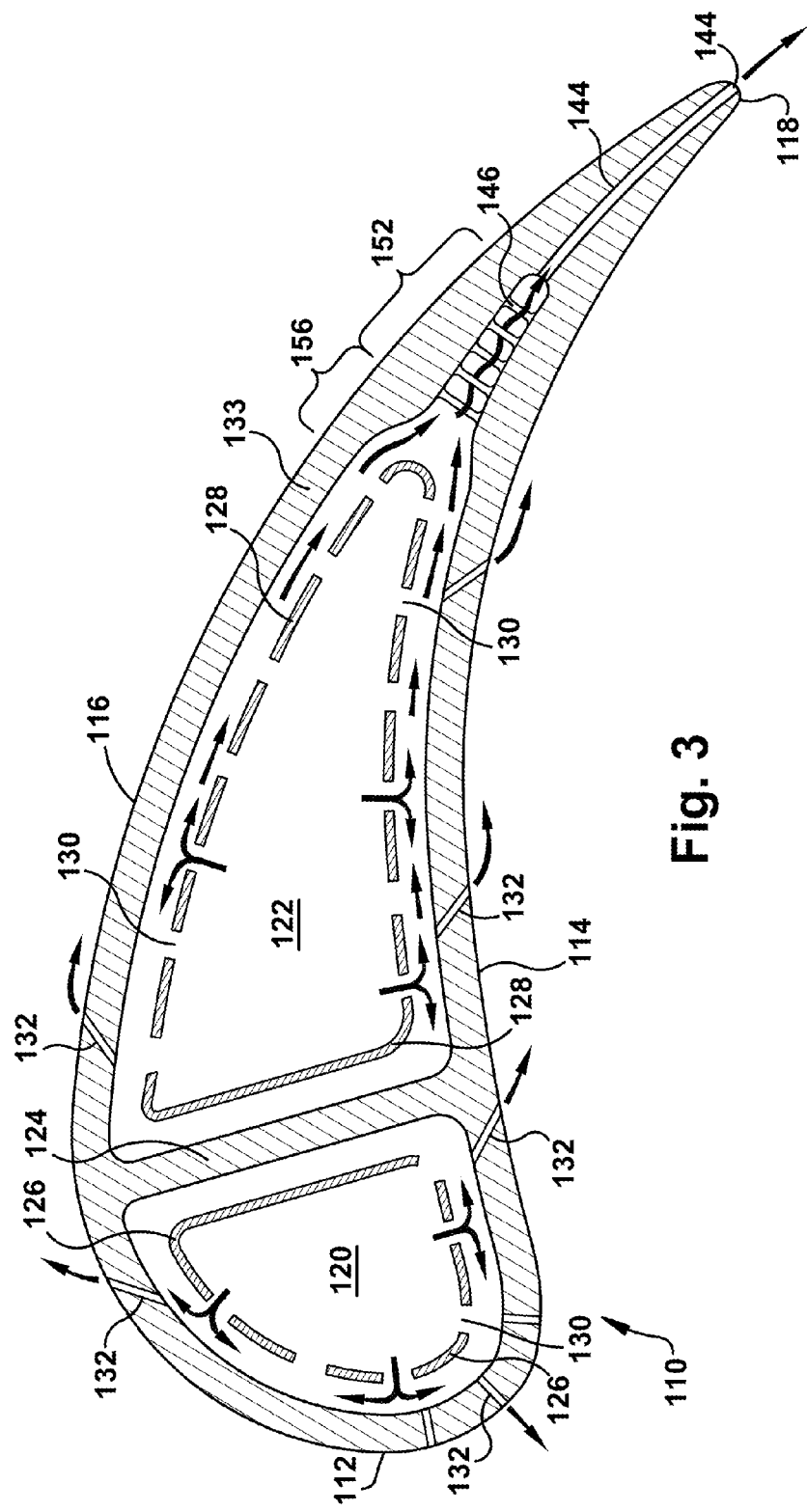
FIG. 3 is an enlarged cross-sectional view of an airfoil illustrating an internal cooling circuit according to an exemplary embodiment of the present application.
Figure 4:
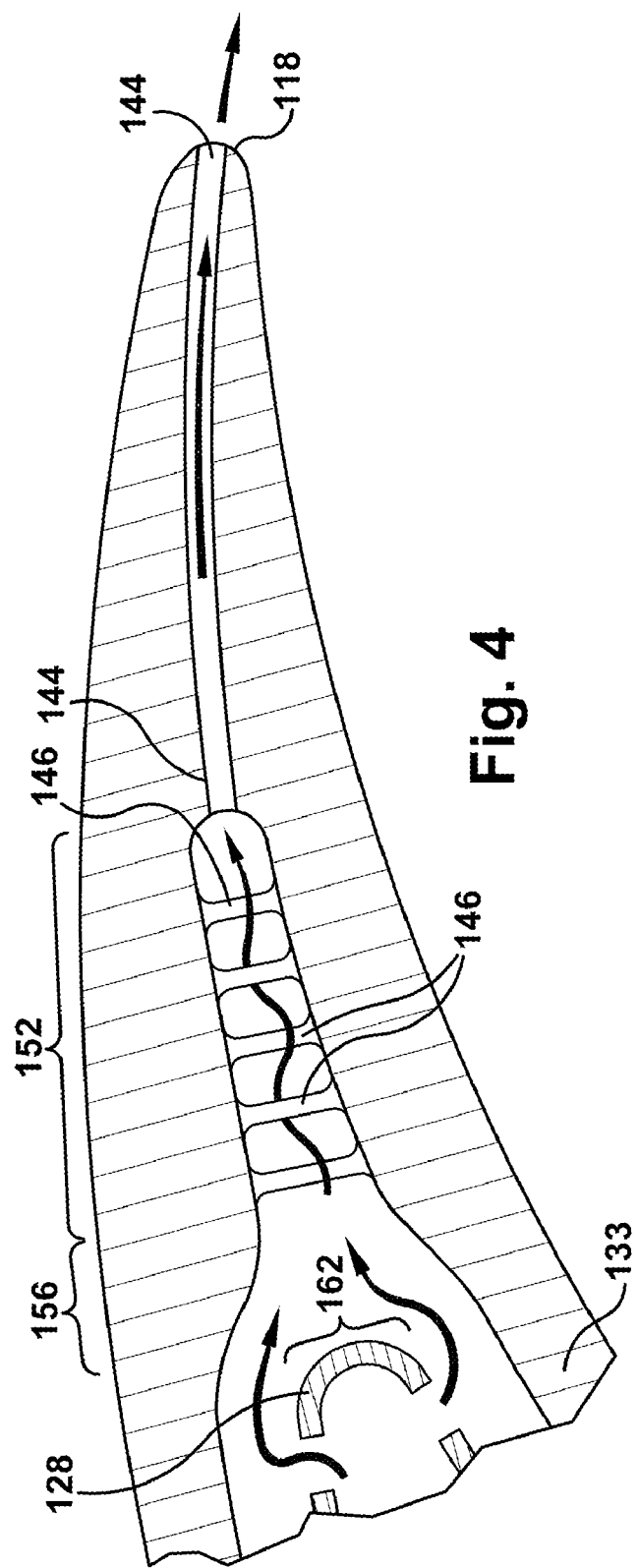
FIG. 4 is a further enlargement of the cross-sectional view of FIG. 3.

Each airfoil, as more clearly seen in FIGS. 3 and 4, is generally hollow and, in the embodiment shown in FIG. 3, is divided into two internal chambers 120, 122 by an intermediate partition 124. Each chamber 120, 122 encloses a hollow insert 126, 128 having a configuration generally conforming to the internal contour of the respective chamber but in spaced relation thereto. The inserts 126, 128 contain insert apertures 130 in preselected locations. High pressure cooling air from the turbine compressor is directed into the inserts per conventional systems and methods, and is exhausted through such apertures to form jets of air striking the inner walls of the chambers 120, 122 for impingement cooling (as shown by the arrows).

More particularly, the insert apertures 130 of insert 126 in the leading edge chamber 120 are located to impinge on the chamber wall opposite the insert 126. The cooling air forced into the leading edge chamber 120 from the insert 126 is exhausted through radially spaced rows of film cooling apertures 132 that pass through the outer wall 133 of the airfoil. The outer wall 133 encloses and forms the interior cavities. The exhausted cooling air that is expelled through the film cooling apertures generally provides a layer of boundary air adjacent the exterior surfaces of the airfoil to limit direct contact of the hot flow on these surfaces. Heat transfer to the airfoil from the working fluid is thereby inhibited.

The cooling air within the trailing edge chamber 122 is exhausted therefrom either through film cooling apertures 132 or through trailing edge cooling apertures 144, which extend from the trailing edge chamber 122 to the trailing edge 118 of the airfoil 110. A plurality of rows of generally cylindrical cooling pins or pins 146 may extend across a pin array section 152 that resides between the trailing edge chamber 122 and the trailing edge cooling aperture 144. Such pins may be integral with the opposing walls defining the pin array section 152. Generally, the pins 146 of each row are offset radially from the pins 146 of adjacent rows to intercept different layers of the cooling air flowing therethrough. The pins 146 generally also may provide mechanical stability to the pin array section 152. A function of the pins 146 is to induce turbulent flow in air flowing through the pin array section 152.

According to exemplary embodiments of the present application, it will be appreciated that the trailing portion of the trailing edge chamber 122 may include a contoured shape or narrowing that transitions from the trailing edge chamber 122 to the pin array section 152, thus forming a contoured exit from the trailing edge chamber 122 that leads to the pin array section 152. This feature will hereinafter be referred to as the "contoured exit 156". The shape of the contoured exit 156 may be described as a curved section that smoothly transitions from the greater width of the trailing edge of the trailing edge chamber 122 to the more narrow width of the pin array section 152.

As described above, in conventional air-cooled airfoils, the general area that coincides with the location of the contoured exit 156 and part of the pin array section 152 is generally a difficult area to cool. That is, the region in between the end of the trailing edge insert 128 and what was the beginning of the pin array 152 in conventional designs is generally an area of low heat transfer coefficients. This is so because there is little or no flow impingement and no heat transfer augmentation features, such as an array of pins, in this area. Therefore, this region is prone to higher metal temperatures, which may decrease the part life of an airfoil. In addition, as described above, releasing air from film cooling apertures 132 that are located downstream of the throat 119 has a significant negative effect to the aerodynamic efficiency of the part. As such, generally, releasing cooling air downstream of the throat 119 (FIG. 2) is avoided or minimized, which adds to the difficulty of keeping this area cool.

In the present invention, several parameters relating to the design of this area of the airfoil 110, i.e., the area that roughly corresponds to the low heat transfer region of the airfoil 110, are modified and optimized such that the extent of the low heat transfer area is minimized and/or cooling of this area is enhanced. Accordingly, a design pursuant to an embodiment of the present invention minimizes the region of low heat transfer by reducing the axial distance between the end of the trailing edge insert 128 and the entrance to the pin array section 152. To minimize this distance, as described in more detail below, several parameters were modified.

First, as shown in FIG. 4, the edge of the trailing edge insert 128 is designed such that it extends toward the pin array section 152 as much as possible while also maintaining the insertability of the trailing edge insert 128. As one of ordinary skill in the art will appreciate, the trailing edge insert 128 generally is not extended back to the extreme trailing edge region of the trailing edge internal chamber 122 (FIG. 3) because of insertability issues. This issue is common in many airfoils because of the narrowness of the airfoil in the trailing edge region and the highly 3-dimensional trailing edge airfoil shape. That is, because the three-dimensional shape of the insert 128 and the varying axial length at different radial heights, the insert 128 cannot be made to extend all the way to the rear of the trailing edge internal chamber 122, i.e., an area of greater axial length on the insert 128 would be blocked by an area of lesser axial length of the chamber 122. However, it has been found that insertability may be maintained while also pushing the trailing edge back further toward the pin array section 152. In the present design, the insert is configured to minimize the gap between the trailing edge of the insert 128 and the beginning of the pin array section 152 while maintaining insertability. Put another way, the insert 128 is configured to extend as far rearward as possible while maintaining insertability.

In addition, the trailing edge 162 of the insert 128 has a minimum curvature that limits how small the trailing edge 162 can be. The minimum curvature is a function of the material from which the insert is made and, generally, limits the sharpness of the curve that may be made at the trailing edge 162 given a desired level of insert 128 durability. For some conventional materials, the minimum curvature is approximately a radius that is equal to twice the wall thickness. Generally, there also is a minimum thickness of the outer wall 133. The minimum thickness of the outer wall 133 is determined given the casting capabilities, a desired level of outer wall 133 durability, including impact resistance, and the material used. As one of ordinary skill in the art will appreciate, there also is a minimum trailing edge passage thickness. As used herein, a minimum trailing edge passage thickness is the minimum clearance between the insert 128 and the outer wall 133 along the trailing edge of the trailing edge internal chamber 122 (FIG. 3).

The minimum trailing edge passage thickness generally is determined by the desired level of flow through the hollow passages of the airfoil 110 (FIG. 3). That is, the trailing edge passage has to a minimum thickness to allow an adequate flow rate for cooling the airfoil 110. More particularly, the minimum thickness of the trailing edge passage is a thickness that allows a minimum level of cooling air to flow through the airfoil, i.e., enough passage room to allow a desired level of flow to reach the trailing edges of the airfoil such that the airfoil is cooled adequately. As a result, it will be appreciated that given the decreasing thickness of the airfoil 110 of the trailing edge 118, there will generally be a maximum distance the insert may be pushed toward the trailing edge 118 of the airfoil 110 that is dictated by the minimum curvature of the insert 128, the minimum outer wall thickness 133, and the minimum clearance between the insert 128 and the outer wall 133. Accordingly, once these minimum distances require that the airfoil 110 be thicker than the actual airfoil design dimensions, the insert 128 has been pushed too far toward the trailing edge 118.

Second, the first pin row of the pin array section 152 is configured so that it is positioned as far forward as possible. Generally, due to manufacturing limitations, the length of a pin 146 is restricted. That is, pins 146 that exceed a certain length are not castable and, thus, substantially impossible or very expensive to manufacture. Generally, this maximum pin length is determined by the casting capabilities given the pin diameter that provides a desired level of heat transfer through the pin array section 152. More particularly, it will be appreciated that maximizing the heat transfer through the pin array will drive the design toward thinner pins. Because of casting limitations, the pin diameter that delivers sufficient or desired heat transfer through this area will have a maximum length. Given this maximum pin length, the pins 146 are pushed as far forward as possible.

Third, in embodiments of the present invention, the contoured exit 156 and the downstream entrance to the pin array section 152 are contoured by increasing the walls thickness on both the pressure side 114 and suction side 116 of the airfoil (FIG. 3). As a result, the first pin row can be pushed further forward while still not exceeding a pin length that would make casting the pin troublesome or overly expensive. With pins now generally located in what was the low heat transfer region 54 (FIG. 1), the cooling of this area is enhanced, the localized hot spot is reduced, and the need for film cooling flow downstream of the throat is minimized. In a preferred embodiment, the shape of the contoured exit 156, moving from leading to trailing portions of the contoured exit 156, may generally form a concave curve that transitions to a convex curve, as illustrated. This shape may allow for a smooth transition that also rapidly narrows the thickness of the trailing edge internal chamber 122 such that the first pin 146 of the pin array section 152 may be pushed forward as much as possible. In addition, this configuration of the contoured exit 156 enhances cooling just downstream of the trailing edge insert 128 as the airfoil walls converge the channel area to maximize cooling air velocity and increase heat transfer coefficients through this channel.

As a result, by minimizing the axial distance between the trailing edge insert 128 and the pin array section 152 and by contouring the entrance to the pin array section 52 as described, localized hot spots that develop in conventional designs may be substantially eliminated. This result decreases the need for film cooling downstream of the throat 119 and decreases the amount of cooling air needed to cool the airfoil during operation, both of which increase the efficiency of the turbine engine.

In some embodiments, the present invention may be used in relation to a stator blade, and, in particular, as a stator blade that is used in the turbine section of a gas turbine engine. This is exemplary, as embodiments of the present invention may also be used in rotor blades. Further, in some of cases, the present invention may be configured for use in a first stage stator blade of the turbine section of a gas turbine engine. In some such embodiments, the gas turbine engine may be a 7FA+e turbine engine manufactured by The General Electric Company of Schenectady, N.Y. Again, the optimized trailing edge cooling circuit according to embodiments of the present invention allows film cooling flow introduced downstream of the nozzle throat to be minimized or eliminated, which decreases aerodynamic mixing losses.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A turbine blade with a generally hollow airfoil having an outer wall that defines a chamber for receiving cooling air, the airfoil comprising a leading edge that resides in an upstream direction, a trailing edge that resides in a downstream direction, a convex suction side, a concave pressure side, and an insert disposed within the chamber that is configured to initially receive at least a portion of the cooling air entering the chamber and direct the cooling air through a plurality of insert apertures to cool the inner surface of the outer wall, the insert further comprising a configuration that generally conforms to the contour of the outer wall of the chamber but in spaced relation thereto, wherein a portion of the cooling air exits the airfoil through a plurality of film cooling apertures formed through the outer wall, wherein the chamber and insert narrow as they extend toward the trailing edge, the insert eventually terminating and the chamber eventually terminating at a pin array section, which includes a passageway in which a plurality of cooling pins extend transversely across and are integral to the opposed walls that define the pin array section, wherein a first distance exists that comprises the generally axial distance between the position of downstream termination point of the insert and the position of an upstream beginning point of the pin array section, wherein the pin array section, at a downstream end, comprises a plurality of openings that define an inlet to a plurality of trailing edge cooling apertures that extend from the pin array section to the trailing edge of the airfoil where an outlet is provided through which a portion of the cooling air may exit the airfoil, and wherein the chamber, the insert, and the pin array section are configured such that the first distance is approximately minimized;

wherein the configuration of the chamber, the insert, and the pin array section that approximately minimizes the first distance includes a contoured exit that makes a smooth transition from the broader diameter of the chamber to the narrow diameter of the pin array section.

2. The turbine blade of claim 1, wherein the turbine blade comprises a rotor blade.

3. The turbine blade of claim 1, wherein the smooth transition of the contoured exit comprises a smooth rapid transition from the broader diameter of the chamber to the narrow diameter of the pin array section.

4. The turbine blade of claim 1, wherein the shape of the contoured exit, as described moving downstream, comprises a concave curve that transitions to a convex curve that narrows the contoured exit rapidly.

5. The turbine blade of claim 1, wherein the pins of the pin array section are configured in a plurality of rows.

6. The turbine blade of claim 1, wherein the chamber comprises a leading edge chamber and a trailing edge chamber that are separated by a partition.

7. The turbine blade of claim 1, wherein all of the film cooling apertures through the outer wall comprise a location upstream of a throat, the throat comprising the minimum flow area between the airfoils of the turbine blade and an airfoil of a neighboring turbine blade once the turbine blade is installed.

8. The turbine blade of claim 1, wherein the configuration of the chamber, the insert, and the pin array section that approximately minimizes the first distance includes the trailing edge of the insert being configured such that the insert extends toward the trailing edge a maximum distance while just maintaining a shape that is insertable into the airfoil during assembly.

9. The turbine blade of claim 1, wherein the configuration of the chamber, the insert, and the pin array section that approximately minimizes the first distance includes the trailing edge of the insert being configured such that the insert extends toward the trailing edge a maximum distance given a minimum curvature of the insert, a minimum wall thickness of the outer wall, and a minimum trailing edge passage thickness.

10. The turbine blade of claim 9, wherein the minimum curvature of the insert comprises a minimum curvature that may be formed in the insert given material limitations and a desired level of durability.

11. The turbine blade of claim 10, wherein the minimum curvature of the insert comprises approximately a radius that is equal to twice the wall thickness of the insert.

12. The turbine blade of claim 9, wherein the minimum outer wall thickness comprises a minimum outer wall thickness that may be formed given material and casting limitations and a desired level of outer wall durability.

13. The turbine blade of claim 9, wherein the minimum trailing edge passage thickness comprises a minimum clearance between the insert and the outer wall along the trailing edge of the chamber given a desired level of flow of cooling air therethrough.

14. The turbine blade of claim 1, wherein the configuration of the chamber, the insert, and the pin array section that approximately minimizes the first distance includes the upstream beginning point of the pin array section extending approximately as far upstream as a maximum pin length allows.

15. The turbine blade of claim 14, wherein the maximum pin length comprises the maximum length of the pins given a desired level of heat transfer through the pin array section and the casting capabilities given the pin diameter that corresponds to that desired level of heat transfer through the pin array section.

16. The turbine blade of claim 1, wherein the turbine blade comprises a stator blade.

17. The turbine blade of claim 16, wherein the turbine blade configured to operate in a 7FA+e turbine engine manufactured by The General Electric Company of Schenectady, N.Y.

18. The turbine blade of claim 1, wherein the turbine blade is configured to operate as a stage one stator blade.

* * * * *